US012230177B2

(12) United States Patent
Kwon et al.

(10) Patent No.: US 12,230,177 B2
(45) Date of Patent: Feb. 18, 2025

(54) LIGHT EMITTING DISPLAY DEVICE AND DRIVING METHOD THEREOF

(71) Applicant: LG Display Co., Ltd., Seoul (KR)

(72) Inventors: Da Hye Kwon, Paju-si (KR); Byung Jae Lee, Paju-si (KR); Jung Heo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/977,797

(22) Filed: Oct. 31, 2022

(65) Prior Publication Data

US 2023/0215308 A1 Jul. 6, 2023

(30) Foreign Application Priority Data

Dec. 30, 2021 (KR) ........................ 10-2021-0193351

(51) Int. Cl.
*G09G 3/00* (2006.01)
*G09G 3/3233* (2016.01)
*G09G 3/3291* (2016.01)

(52) U.S. Cl.
CPC ........... *G09G 3/006* (2013.01); *G09G 3/3233* (2013.01); *G09G 3/3291* (2013.01); *G09G 2300/0819* (2013.01); *G09G 2300/0842* (2013.01); *G09G 2310/08* (2013.01); *G09G 2320/0295* (2013.01); *G09G 2330/12* (2013.01)

(58) Field of Classification Search
None
See application file for complete search history.

(56) References Cited

U.S. PATENT DOCUMENTS

2020/0193918 A1* 6/2020 Hwang ................ G09G 3/3291
2020/0210010 A1* 7/2020 Kim ..................... G09G 3/3233

FOREIGN PATENT DOCUMENTS

KR 10-2016-0027583 A 3/2016

OTHER PUBLICATIONS

Office Action issued on Dec. 16, 2024 in corresponding Korean Patent Application No. 10-2021-0193351.

* cited by examiner

*Primary Examiner* — Ifedayo B Iluyomade
(74) *Attorney, Agent, or Firm* — Morgan, Lewis & Bockius LLP

(57) ABSTRACT

A light emitting display device includes a display panel including subpixels connected to a reference line, and a data driver connected to data lines of the display panel. The data driver simultaneously acquires degradation information values as to the subpixels through the data lines after driving transistors included in the subpixels perform a source-following operation by a reference voltage transmitted through the reference line and a data voltage for sensing transmitted through the data lines.

12 Claims, 15 Drawing Sheets

LIGHT EMITTING DISPLAY DEVICE AND DRIVING METHOD THEREOF

This application claims the benefit of Korean Patent Application No. 10-2021-0193351 filed on Dec. 30, 2021, which is hereby incorporated by reference as if fully set forth herein.

BACKGROUND

Technical Field

The present invention relates to a light emitting display device and a driving method thereof.

Discussion of the Related Art

In accordance with development of information technology, the market for display devices as a medium interconnecting users and information is expanding. As such, use of display devices such as a light emitting display (LED) device, a quantum dot display (QDD) device, a liquid crystal display (LCD) device and the like is increasing.

The above-mentioned display devices include a display panel including subpixels, a driver configured to output a drive signal for driving the display panel, and a power supply configured to generate electric power to be supplied to the display panel or the driver.

When drive signals, for example, scan signals and data signals, are supplied to subpixels formed at a display panel in a display device as mentioned above, selected ones of the subpixels transmit light or directly emit light and, as such, the display device may display an image.

SUMMARY

Accordingly, embodiments of the present disclosure are directed to a light emitting display device and a driving method thereof that substantially obviate one or more problems due to limitations and disadvantages of the related art.

An aspect of the present disclosure is to provide a light emitting display device and a driving method thereof which are capable of not only eliminating a separate sensing line for acquiring a degradation information value, but also simultaneously acquiring degradation information values as to at least three subpixels while omitting a procedure of charging a parasitic capacitor, upon acquiring degradation information values, thereby achieving a reduction in sensing time.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a light emitting display device comprises a display panel including subpixels connected to a reference line, and a data driver connected to data lines of the display panel, wherein the data driver simultaneously acquires degradation information values as to the subpixels through the data lines after driving transistors included in the subpixels perform a source-following operation by a reference voltage transmitted through the reference line and a data voltage for sensing transmitted through the data lines.

The data driver may estimate degradation degrees of the driving transistors included in the subpixels after removing parasitic capacitances formed at the data lines based on degradation information values acquired through sensing operations of the data lines and a previously-extracted lookup table.

The lookup table may be provided based on operations of driving the subpixels such that charge sharing occurs between capacitors included in the subpixels and parasitic capacitors formed at the data lines, and repeatedly detecting parasitic capacitances of the parasitic capacitors formed at the data lines while varying the reference voltage.

Each of the subpixels may further include a capacitor having a first electrode connected to a gate electrode of the driving transistor and a second electrode connected to a second electrode of the driving transistor, an organic light emitting diode having an anode connected to the second electrode of the driving transistor and a cathode connected to a second power line, a first switching transistor having a gate electrode connected to a first scan line, a first electrode connected to a corresponding one of the data lines, and a second electrode connected to a gate electrode of the driving transistor, and a second switching transistor having a gate electrode connected to a second scan line, a first electrode connected to the reference line, and a second electrode connected to the anode of the organic light emitting diode.

In another aspect, a driving method of a light emitting display device comprises applying a reference voltage through a reference line connected to subpixels of a display panel, applying a data voltage for sensing through data lines of the display panel by driving a data driver configured to drive the display panel, and simultaneously acquiring degradation information values as to the subpixels through the data lines after driving transistors included in the subpixels perform a source-following operation by a reference voltage transmitted through the reference line and the data voltage for sensing transmitted through the data lines.

In another aspect, a light emitting display device comprises a display panel including subpixels connected to a reference line, and a data driver connected to data lines of the display panel, wherein the data driver varies a reference voltage transmitted through the reference line and a data voltage for sensing transmitted through the data lines such that the reference voltage and the data voltage for sensing are equal to each other, after driving transistors included in the subpixels perform a source-following operation by the reference voltage and the data voltage for sensing, and the data driver then simultaneously acquires degradation information values as to the subpixels through the data lines.

The data driver may simultaneously acquire the degradation information values as to the subpixels based on a current-to-voltage converter configured to convert current into a voltage and a digital-to-analog converter configured to convert a digital signal into an analog signal.

The current-to-voltage converter and the digital-to-analog converter may operate in a form of an integrator, and may acquire current flowing through the data lines, as the degradation information values as to the subpixels, as the reference voltage and the data voltage for sensing are varied to be equal to each other.

The current-to-voltage converter and the digital-to-analog converter may operate in a form of a current mirror, and may acquire current flowing through the data lines, as the degradation information values as to the subpixels, as the reference voltage and the data voltage for sensing are varied to be equal to each other.

In still another aspect of the present invention, there is provided a driving method of a light emitting display device including applying a reference voltage through a reference line connected to subpixels of a display panel, applying a data voltage for sensing through data lines of the display panel by driving a data driver configured to drive the display panel, and varying a reference voltage transmitted through the reference line and a data voltage for sensing transmitted through the data lines such that the reference voltage and the data voltage for sensing are equal to each other, after driving transistors included in the subpixels perform a source-following operation by the reference voltage and the data voltage for sensing, and then simultaneously acquiring degradation information values as to the subpixels through the data lines.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and along with the description serve to explain principles of the disclosure. In the drawings.

DETAILED DESCRIPTION

A display device according to an exemplary embodiment of the present invention may be implemented as a television, an image player, a personal computer (PC), a home theater, an automobile electric device, a smartphone, etc., without being limited thereto. The display device according to the exemplary embodiment of the present invention may be implemented as a light emitting display (LED) device, a quantum dot display (QDD) device, a liquid crystal display (LCD) device, etc. However, the following description will be given in conjunction with, for example, a light emitting display device configured to directly emit light based on an inorganic light emitting diode or an organic light emitting diode, for convenience of description.

Figure 1:
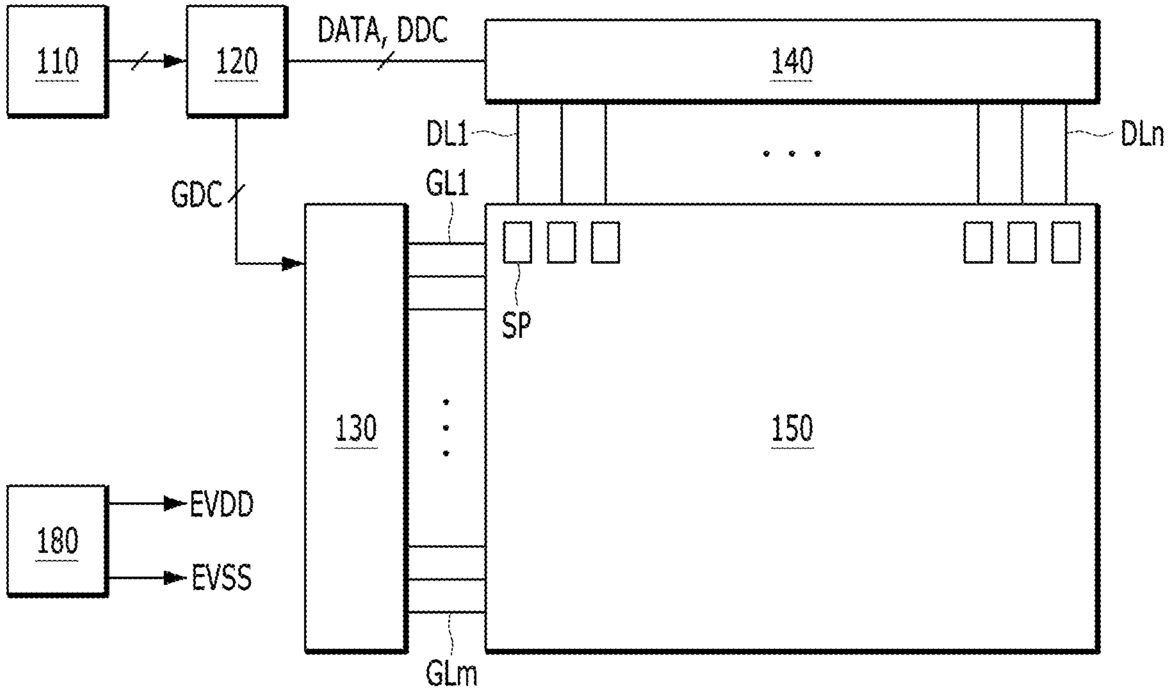
FIG. 1 is a block diagram schematically showing a light emitting display device.
Figure 2:
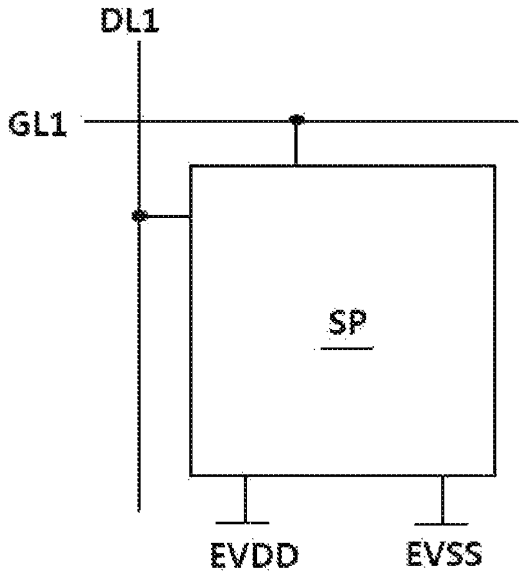
FIG. 2 is a diagram schematically showing a subpixel shown in FIG. 1.

FIG. 1 is a block diagram schematically showing a light emitting display device. FIG. 2 is a diagram schematically showing a subpixel shown in FIG. 1.

As shown in FIGS. 1 and 2, the light emitting display device may include an image supplier 110, a timing controller 120, a scan driver 130, a data driver 140, a display panel 150, a power supply 180, etc.

The image supplier 110 (a set or a host system) may output various driving signals together with an image data signal supplied from an exterior thereof or an image data signal stored in an inner memory thereof. The image supplier 110 may supply a data signal and various driving signals to the timing controller 120.

The timing controller 120 may output a gate timing control signal GDC for control of an operation timing of the scan driver 130, a data timing control signal DDC for control of an operation timing of the data driver 140, various synchronization signals (a vertical synchronization signal Vsync and a horizontal synchronization signal Hsync), etc. The timing controller 120 may supply, to the data driver 140, a data signal DATA supplied from the image supplier 110 together with the data timing signal DDC. The timing controller 120 may take the form of an integrated circuit (IC) and, as such, may be mounted on a printed circuit board, without being limited thereto.

The scan driver 130 may output a scan signal (or a scan voltage) in response to the gate timing control signal GDC supplied from the timing controller 120. The scan driver 130 may supply a scan signal to the subpixels included in the display panel 150 through gate lines GL1 to GLm. The scan driver 130 may take the form of an IC or may be directly formed on the display panel 150 in a gate-in-panel manner, without being limited thereto.

The data driver 140 may sample and latch a data signal DATA in response to the data timing control signal DDC supplied from the timing controller 120, may convert the resultant data signal, which has a digital form, into a data voltage having an analog form, based on a gamma reference voltage, and may output the data voltage. The data driver 140 outputs the data voltage to the subpixels included in the display panel 150 through data lines DL1 to DLn. The data driver 140 may be formed in the form of an IC and, as such, may be mounted on the display panel 150 or may be mounted on a printed circuit board, without being limited thereto.

The power supply 180 may generate first power of a high-level voltage and second power of a low-level voltage based on an external input voltage supplied from an exterior thereof, and may output the first power and the second power through a first power line EVDD and a second power line EVSS. The power supply 180 may generate and output not only the first power and the second power, but also a voltage (for example, a gate voltage including a gate-high voltage and a gate-low voltage) required for driving of the scan driver 130, a voltage (a drain voltage and a drain voltage including a half drain voltage) required for driving of the data driver 140, etc.

The display panel 150 may display an image, in response to the driving signal including the scan signal and the data voltage, the first power, the second power, etc. The subpixels of the display panel 150 may directly emit light. The display panel 150 may be fabricated based on a substrate having stiffness or ductility, such as glass, silicon, polyimide or the like. The subpixels, which emit light, may be constituted by red, green and blue subpixels or red, green, blue and white subpixels.

For example, one subpixel SP may include a pixel circuit connected to a first data line DL1, a first gate line GL1, a first power line EVDD and a second power line EVSS while including a switching transistor, a driving transistor, a capacitor, an organic light emitting diode, etc. The subpixel SP, which is used in the light emitting display device, has a complex circuit configuration because the subpixel SP directly emits light. Furthermore, a compensation circuit configured to compensate for degradation of not only the organic light emitting diode, which emits light, but also the driving transistor configured to supply driving current to the organic light emitting diode, etc. is also diverse. For convenience of illustration, however, the subpixel SP is simply shown in the form of a block.

Meanwhile, in the above description, the timing controller 120, the scan driver 130, the data driver 140, etc. have been described as having individual configurations, respectively. However, one or more of the timing controller 120, the scan driver 130 and the data driver 140 may be integrated in one IC in accordance with an implementation type of the light emitting display device.

Figure 3:
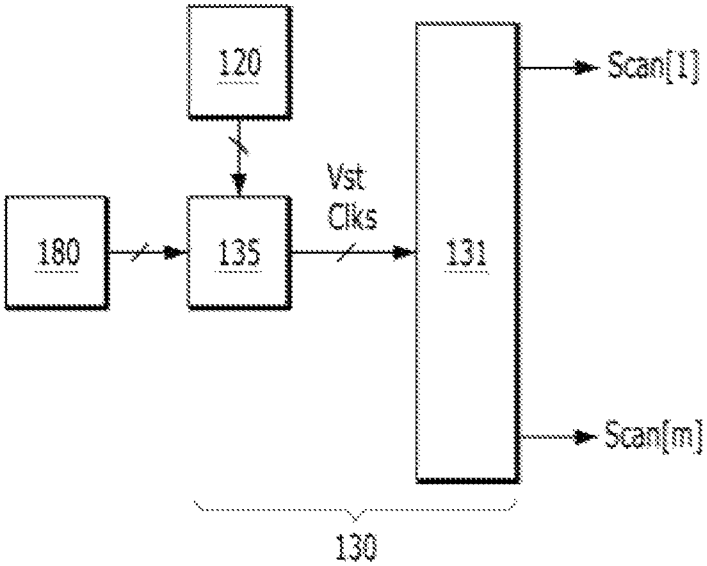
FIGS. 3 and 4 are views explaining a configuration of a gate-in-panel type scan driver.
Figure 4:
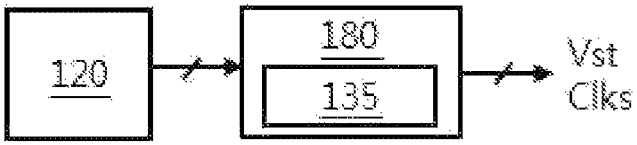
Figure 5A:
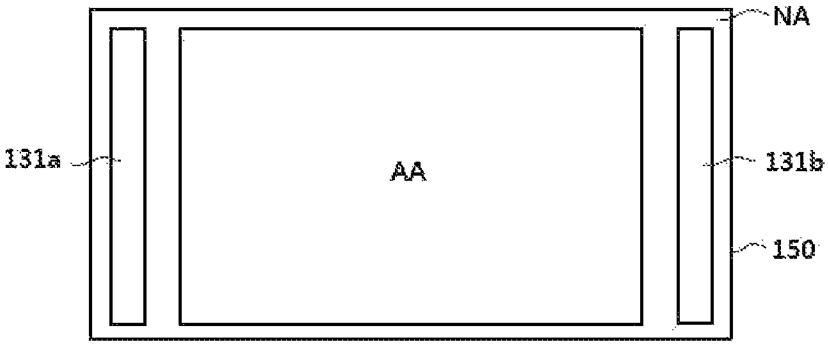
FIGS. 5A and 5B are views showing a disposition example of the gate-in-panel type scan driver.
Figure 5B:
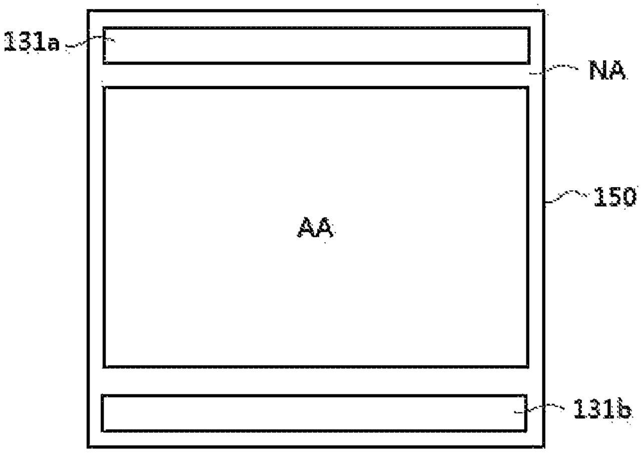

FIGS. 3 and 4 are views explaining a configuration of a gate-in-panel type scan driver. FIGS. 5A and 5B are views showing a disposition example of the gate-in-panel type scan driver.

As shown in FIG. 3, the gate-in-panel type scan driver, which is designated by reference numeral "130", may include a shift register 131 and a level shifter 135. The level shifter 135 may generate clock signals Clks and a start signal Vst based on signals and voltages output from a timing controller 120 and a power supply 180. The clock signals Clks may be generated under the condition that the clock signals Clks have K different phases (K being an integer of 2 or greater), such as 2-phase, 4-phase, 8-phase, etc.

The shift register 131 may operate based on the signals Clks and Vst output from the level shifter 135, and may output scan signals Scan[1] to Scan[m] capable of turning on or off transistors formed at a display panel. The shift register 131 is formed on the display panel in a gate-in-panel manner in the form of a thin film.

As shown in FIGS. 3 and 4, the level shifter 135 may be independently formed in the form of an IC or may be internally included in the power supply 180, differently from the shift register 131. However, this configuration is only illustrative, and the exemplary embodiments of the present invention are not limited thereto.

As shown in FIGS. 5A and 5B, in a gate-in-panel type scan driver, shift registers 131*a* and 131*b*, which output scan signals, may be disposed in a non-display area NA of a display panel 150. The shift registers 131*a* and 131*b* may be disposed in left and right non-display areas NA of the display panel 150, as shown in FIG. 5A, or may be disposed in upper and lower non-display areas NA of the display panel 150, as shown in FIG. 5B. Meanwhile, although the shift registers 131*a* and 131*b* have been shown and described in FIGS. 5A and 5B as being disposed in the non-display area NA, the exemplary embodiments of the present invention are not limited thereto.

Figure 6:
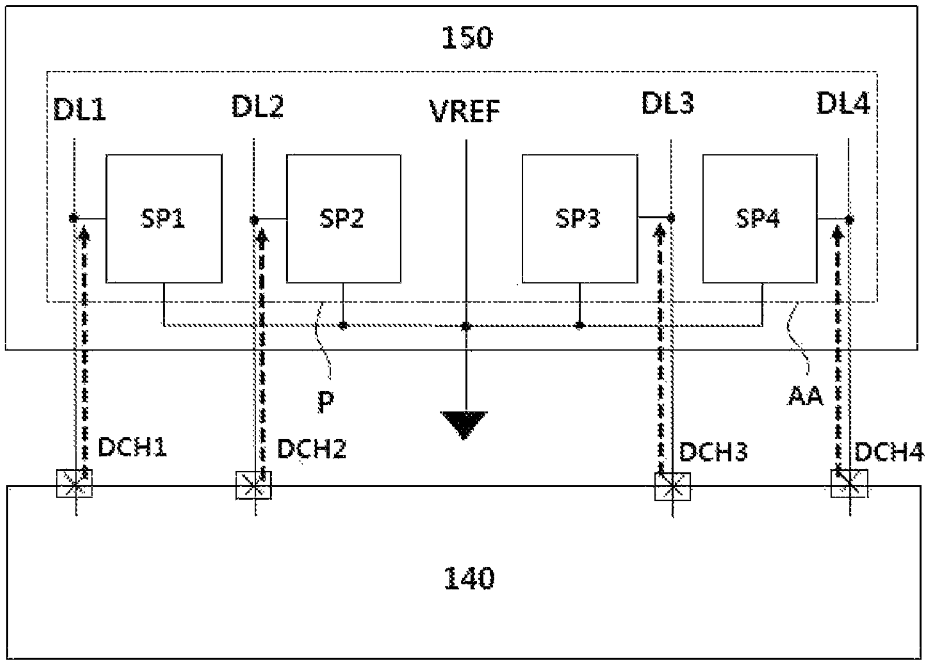
FIGS. 6 and 7 are views explaining a light emitting display device according to a first embodiment of the present invention.
Figure 7:
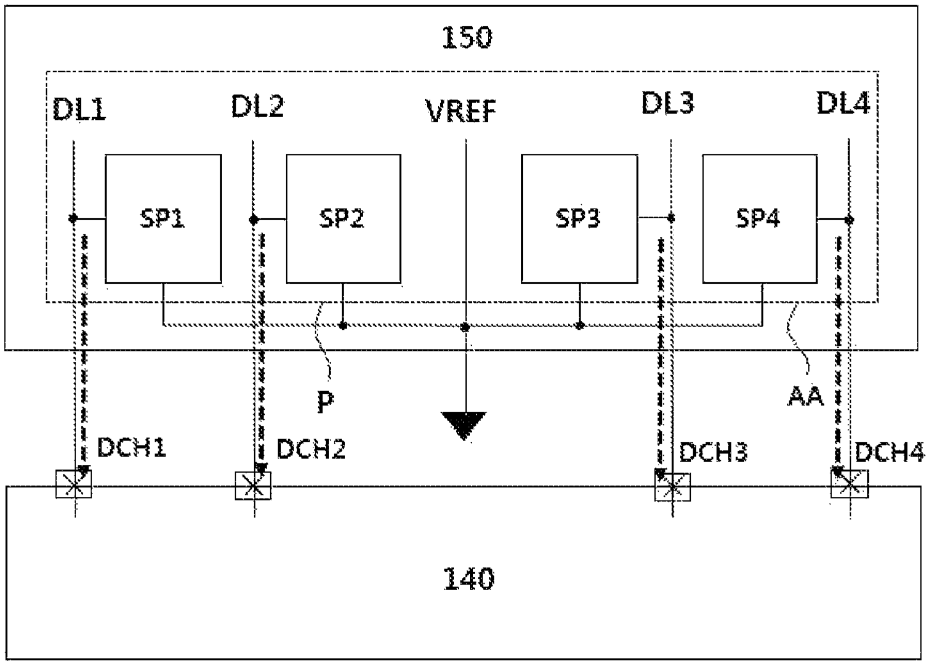
Figure 8:
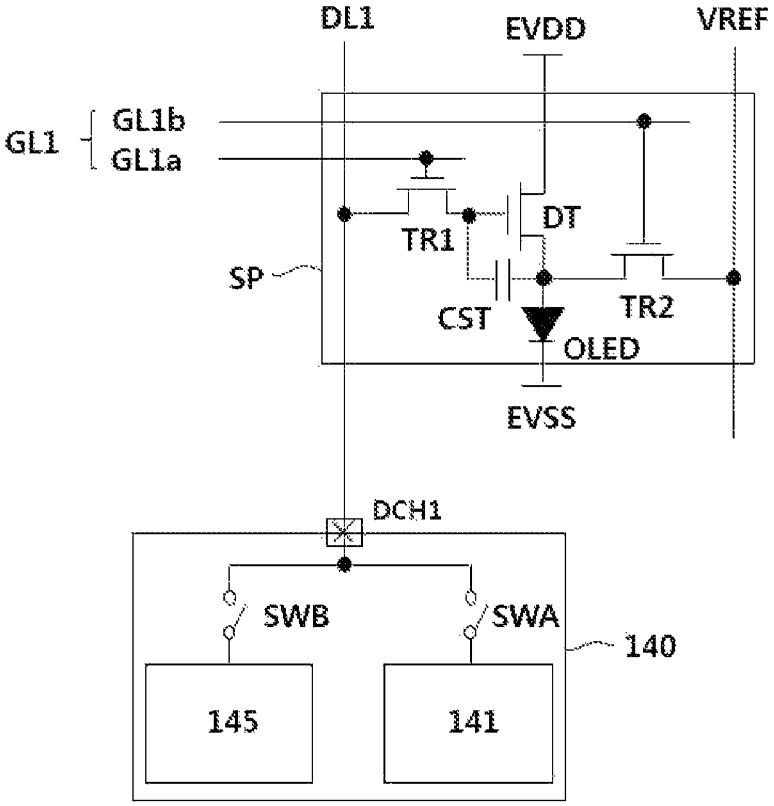
FIG. 8 is a view briefly showing a subpixel and a data driver according to the first embodiment of the present invention.
Figure 9:
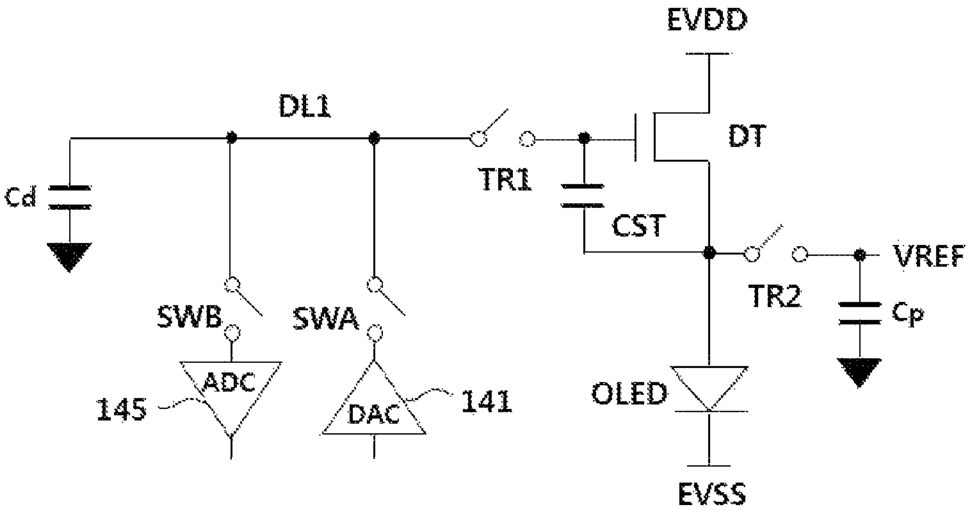
FIG. 9 is a view more concretely showing a part of a configuration of the data driver shown in FIG. 8.

FIGS. 6 and 7 are views explaining a light emitting display device according to a first embodiment of the present invention. FIG. 8 is a view briefly showing a subpixel and a data driver according to the first embodiment of the present invention. FIG. 9 is a view more concretely showing a part of a configuration of the data driver shown in FIG. 8.

As shown in FIG. 6, a plurality of pixels may be disposed in a display area AA of a display panel 150. One pixel P may include a first subpixel SP1, a second subpixel SP2, a third subpixel SP3, and a fourth subpixel SP4. The first to fourth subpixels SP1 to SP4 may emit red, white, green and blue, respectively. Of course, this configuration is only illustrative, and one pixel P may be constituted by three subpixels configured to emit red, green and blue, respectively.

The first subpixel SP1, the second subpixel SP2, the third subpixel SP3, and the fourth subpixel SP4 may be independently connected to a first data line DL1, a second data line DL2, a third data line DL3, and a fourth data line DL4, respectively. The first subpixel SP1, the second subpixel SP2, the third subpixel SP3, and the fourth subpixel SP4 may be connected to a reference line VREF in common.

The reference line VREF may be disposed in plural on the display panel 150. The reference line VREF may be connected to all subpixels disposed on the display panel 150 in common and, as such, may be disposed in the form of a net. The reference line VREF may be electrically connected to a data driver 140 or a reference voltage source disposed on a separate substrate, and may transmit a reference voltage output from the reference voltage source. Accordingly, the data driver 140 may have a reference voltage output channel for outputting the reference voltage.

The data driver 140 may be connected to the display panel 150. The data driver 140 may include a first input/output channel DCH1, a second input/output channel DCH2, a third input/output channel DCH3, and a fourth input/output channel DCH4. The first input/output channel DCH1, the second input/output channel DCH2, the third input/output channel DCH3, and the fourth input/output channel DCH4 may be independently connected to the first data line DL1, the second data line DL2, the third data line DL3, and the fourth data line DL4, respectively.

The data driver 140 may simultaneously apply a data voltage for sensing (hereinafter referred to as a sensing data voltage) to the first subpixel SP1, the second subpixel SP2, the third subpixel SP3 and the fourth subpixel SP4 through the first to fourth input/output channels DCH1 to DCH4. Thereafter, the data driver 140 may simultaneously acquire degradation information values formed at the first subpixel SP1, the second subpixel SP2, the third subpixel SP3 and the fourth subpixel SP4 through the first to fourth input/output channels DCH1 to DCH4, as shown in FIG. 7.

The data driver 140 may simultaneously acquire degradation information values formed at the first subpixel SP1, the second subpixel SP2, the third subpixel SP3 and the fourth subpixel SP4, that is, four subpixels. However, when one pixel is constituted by three subpixels, the data driver 140 may simultaneously acquire degradation information values formed at the three subpixels. In addition, the data driver 140 may simultaneously acquire degradation information values as to all subpixels included in the display panel 150. Otherwise, the data driver 140 may group all data lines into a plurality of groups such that each group includes a plurality of data lines, and may simultaneously acquire degradation information values as to the subpixels on a data line group basis.

As shown in FIG. 8, one subpixel SP may include a first switching transistor TR1, a driving transistor DT, a second switching transistor TR2, a capacitor CST, and an organic light emitting diode OLED.

The driving transistor DT may be connected, at a gate electrode thereof, to one end of the capacitor CST while being connected, at a first electrode thereof, to a first power line EVDD and connected, at a second electrode thereof, to an anode of the organic light emitting diode OLED and the other end of the capacitor CST. The capacitor CST may be connected, at the one end thereof (a first electrode), to the gate electrode of the driving transistor DT while being connected, at the other end thereof (a second electrode), to the anode of the light emitting diode OLED. The organic light emitting diode OLED may be connected, at the anode thereof, to the second electrode of the driving transistor DT while being connected, at a cathode thereof, to a second power line EVSS.

The first switching transistor TR1 may be connected, at a gate electrode thereof, to a first scan line GL1*a* included in a first gate line GL1 while being connected, at a first electrode thereof, to the first data line DL1 and connected, at a second electrode thereof, to the gate electrode of the driving transistor DT. The first switching transistor TR1 may be turned on, in response to a first scan signal transmitted thereto through the first scan line GL1*a*.

The second switching transistor TR2 may be connected, at a gate electrode thereof, to a second scan line GL1*b* included in the first gate line GL1 while being connected, at a first electrode thereof, to a reference line VREF and connected, at a second electrode thereof, to the anode of the organic light emitting diode OLED. The second switching transistor TR2 may be turned on, in response to a second scan signal transmitted thereto through the second scan line GL1*b*.

The data driver 140 may include a first switch SWA, a second switch SWB, a first driving circuit 141, a second driving circuit 145, etc. The data driver 140 may not only output a sensing data voltage, a data voltage for display (hereinafter referred to as a display data voltage), a black data voltage, etc. through the first input/output channel DCH1, but also may acquire a degradation information value formed at the subpixel SP.

The first switch SWA may be connected, at a first electrode thereof, to the first input/output channel DCH1 while being connected, at a second electrode thereof to the first driving circuit 141 and connected, at a control electrode thereof, to a control circuit internally included in the data driver 140. The first switch SWA may electrically connect or disconnect the first driving circuit 141 to or from the first input/output channel DCH1, in response to a first switch control signal output from the control circuit.

The second switch SWB may be connected, at a first electrode thereof, to the first input/output channel DCH1 while being connected, at a second electrode thereof, to the second driving circuit 145 and connected, at a control electrode thereof, to the control circuit internally included in the data driver 140. The second switch SWB may electrically connect or disconnect the second driving circuit 145 to or from the first input/output channel DCH1, in response to a second switch control signal output from the control circuit.

As shown in FIG. 9, the first driving circuit 141 may include a digital-to-analog converter (hereinafter referred to as a DA converter) DAC configured to convert a digital signal into an analog signal (voltage) in order to output a sensing data voltage, a display data voltage, a black data voltage, etc. In addition, the second driving circuit 145 may include an analog-to-digital converter (hereinafter referred to as an AD converter) ADC configured to convert an analog signal (voltage) into a digital signal in order to acquire a degradation information value. In FIG. 9, reference character "Cd" may designate a first parasitic capacitor formed at the first data line DL1, and reference character "Cp" may designate a second parasitic capacitor formed at the reference line VREF.

Figure 10:
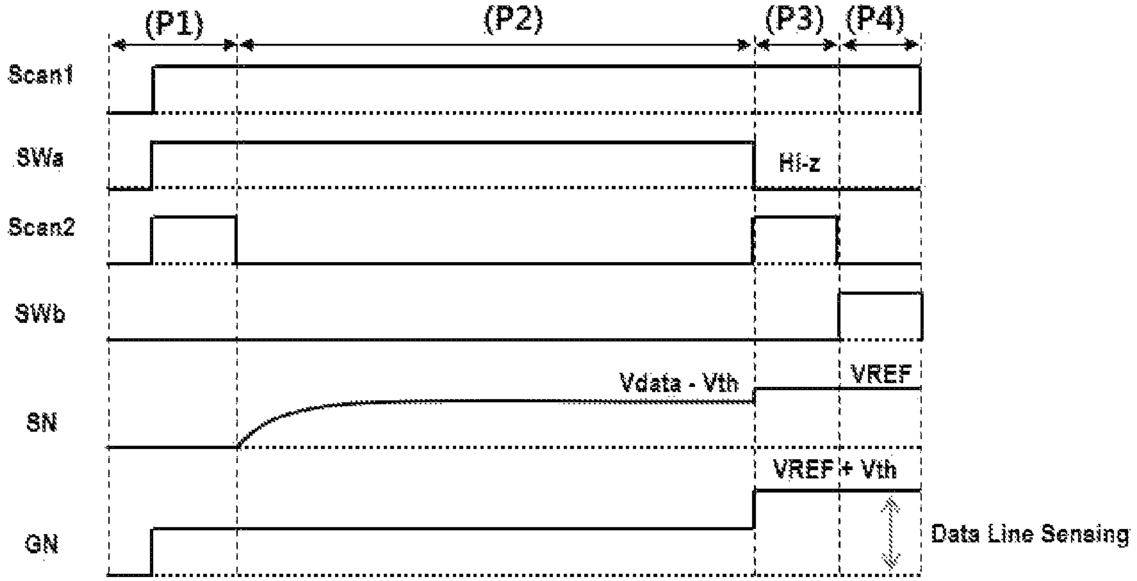
FIG. 10 is a driving waveform diagram explaining a driving method of the light emitting display device according to the first embodiment of the present invention.

FIG. 10 is a driving waveform diagram explaining a driving method of the light emitting display device according to the first embodiment of the present invention. FIGS. 11 to 14 are circuit diagrams explaining operation of the light emitting display device on a period basis according to the first embodiment of the present invention.

As shown in FIG. 10, the light emitting display device according to the first embodiment of the present invention may be driven in an order of a first period P1, a second period P2, a third period P3 and a fourth period P4.

A first scan signal Scan1 may be applied in a logic high state in a period from the first period P1 to the fourth period P4. A first switch signal SWa may be applied in a logic high state in a period from the first period P1 to the second period P2. A second scan signal Scan2 may be applied in a logic high state only in the first period P1 and the third period P3. A second switch signal SWb may be applied in a logic high state only in the fourth period P4.

Figure 11:
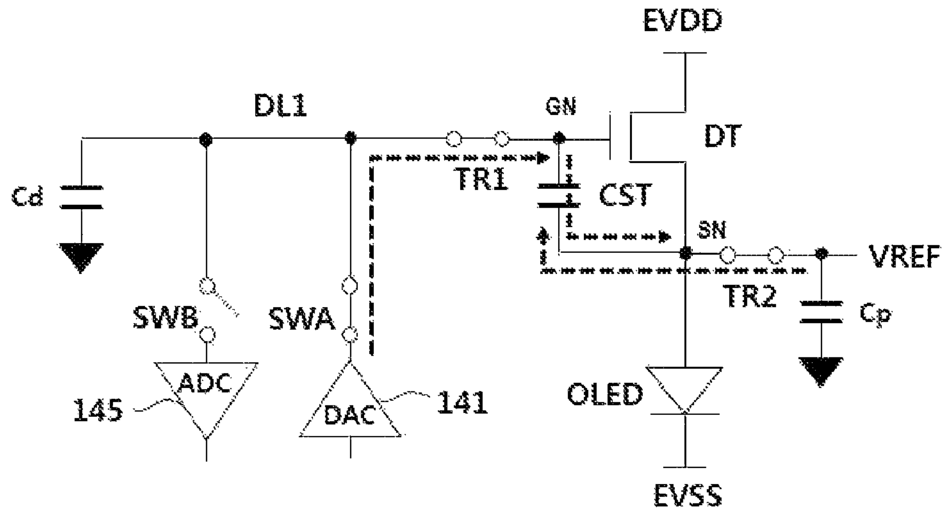
FIGS. 11 to 14 are circuit diagrams explaining operation of the light emitting display device on a period basis according to the first embodiment of the present invention.

As shown in FIGS. 10 and 11, during the first period P1, the DA converter DAC may output a sensing data voltage. The sensing data voltage output from the DA converter DAC may be applied to a gate node GN through the turned-on first switch SWA and the turned-on first switching transistor TR1. In addition, the sensing data voltage may be applied to a source node SN through both ends of the capacitor CST. A reference voltage may be transmitted to the reference line VREF during the first period P1. The reference voltage transmitted from the reference line VREF may be applied to the source node SN through the turned-on second switching transistor TR2. In addition, the reference voltage may be applied to the other end of the capacitor CST. As a result, the gate node GN and the source node SN distinguished from each other with reference to the capacitor CST may be initialized.

Figure 12:
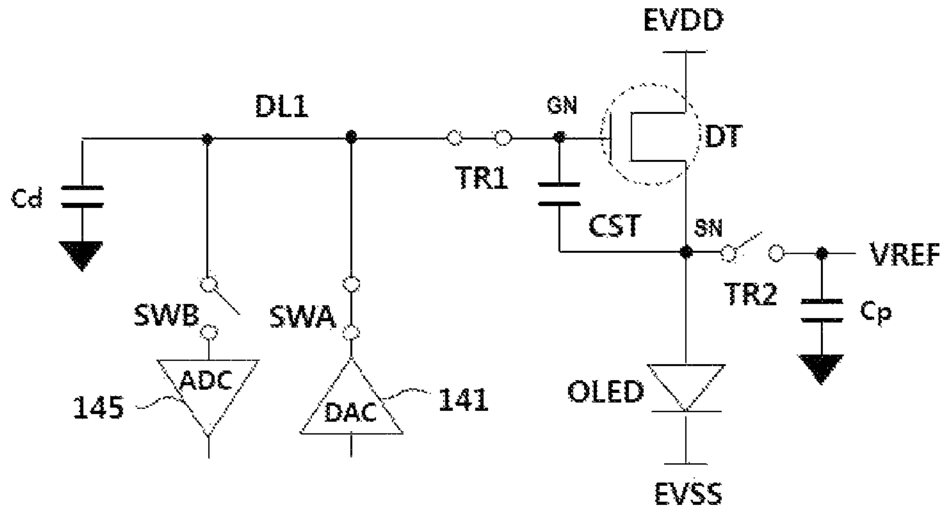

As shown in FIGS. 10 and 12, during the second period P2, the second switching transistor TR2 may be switched to a turn-off state. As a result, the driving transistor DT may perform a source-following operation by the sensing data voltage applied to the gate node GN and the reference voltage applied to the source node SN. In accordance with the source-following operation of the driving transistor DT, the voltage of the source node SN may rise up to a level "Vdata−Vth". The level "Vdata−Vth" means a level obtained by deducting a threshold voltage of the driving transistor DT from the sensing data voltage.

Figure 13:
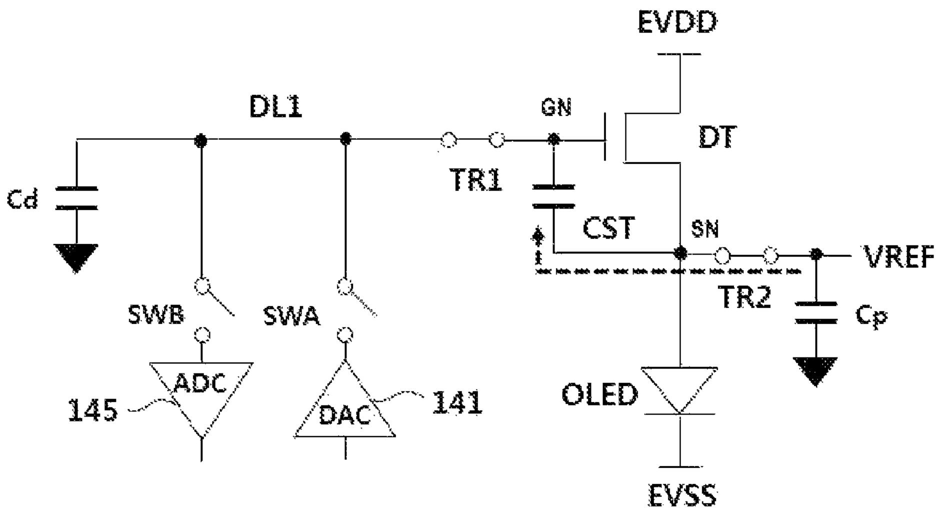

As shown in FIGS. 10 and 13, during the third period P3, the second switching transistor TR2 may be switched to a turn-on state. As the second switching transistor TR2 is turned on, the reference voltage transmitted to the reference line VREF may be applied to the other end of the capacitor CST. As a result, the voltage of the source node SN of the driving transistor DT may rise up to the reference voltage VREF. In addition, the voltage of the gate node GN of the driving transistor DT may rise up to a level "VREF+Vth" due to influence of a voltage across the capacitor CST. The first switch SWA may be maintained in a turn-off state during the third period P3. In addition, during the third period P3, the DA converter DAC may be maintained in a high impedance state Hi-z in which the DA converter DAC does not output any voltage including the sensing data voltage, etc.

Figure 14:
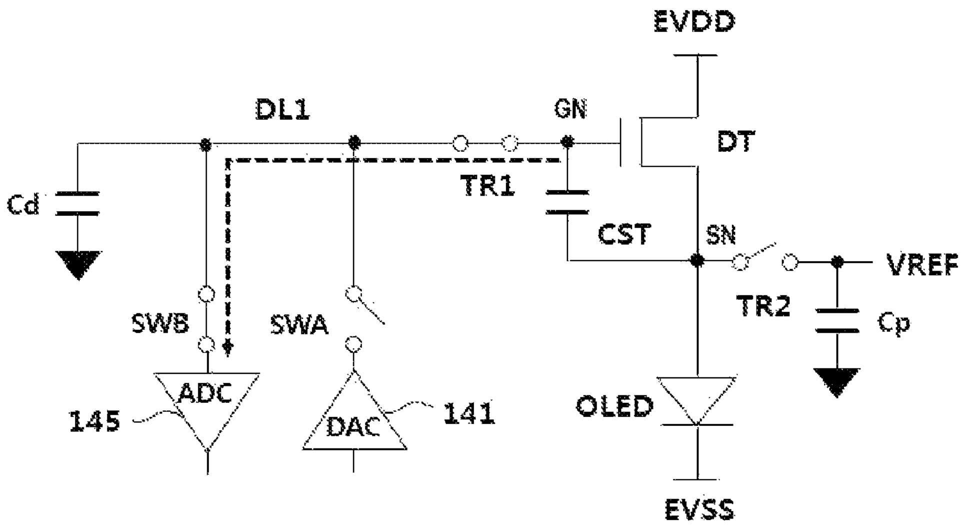

As shown in FIGS. 10 and 14, during the fourth period P4, the second switch SWB may be turned on, and the AD converter ADC may acquire the voltage "VREF+Vth", as a degradation information value, through the first data line DL1. The AC converter ADC may convert the degradation information value, which has an analog form and is acquired through the first data line DL1, into sensing data having a digital form, and may output the sensing data.

The sensing data output from the AD converter ADC may be used as a compensation value or the like for estimation of and compensation for a degradation degree of the driving transistor DT. Meanwhile, for estimation of and compensation for a degradation degree of the driving transistor DT, from among "VREF" and "Vth" of "VREF+Vth", only "Vth", which is the threshold voltage of the driving transistor DT, is used, and "VREF", which is the reference voltage, is not used ("VREF" is deleted through processing of a circuit, an algorithm or the like).

FIGS. 15 to 18 are circuit diagrams explaining operation of a light emitting display device according to a variant of the first embodiment of the present invention.

Under the condition that the light emitting display device operates in an order of FIGS. 11 to 14, a degradation information value may be incorrectly acquired due to influence of charge sharing when the capacitance of the capacitor CST included in the subpixel is greater than the capacitance of the first parasitic capacitor Cd formed at the first data line DL1.

In order to solve the problem in which a degradation information value is incorrectly acquired due to the first parasitic capacitor Cd formed at the data line, information as to the parasitic capacitance formed at the data line may be previously extracted in the form of a lookup table in the variant of the first embodiment of the present invention. In addition, the parasitic capacitance formed at the data line may be removed based on the degradation information value acquired through a sensing operation and the previously-extracted lookup table and, as such, a compensation value for estimation of and compensation for a degradation degree of the driving transistor DT may then be provided.

A lookup table extraction operation may be performed in a manner as described below.

Figure 15:
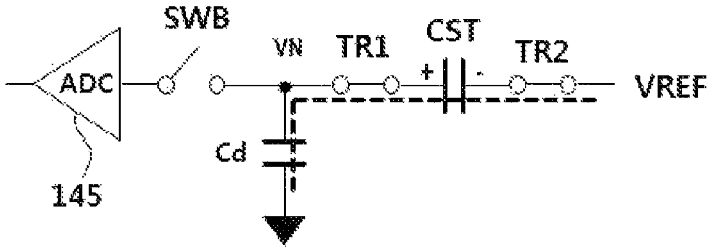
FIGS. 15 to 18 are circuit diagrams explaining operation of a light emitting display device according to a variant of the first embodiment of the present invention.

As shown in FIG. 15, driving may be performed such that charge sharing occurs between a capacitor CST included in a subpixel and a first parasitic capacitor Cd formed at a data line. To this end, first and second switching transistors TR1 and TR2 may be turned on, and a reference voltage may be applied to a reference line VREF.

Figure 16:
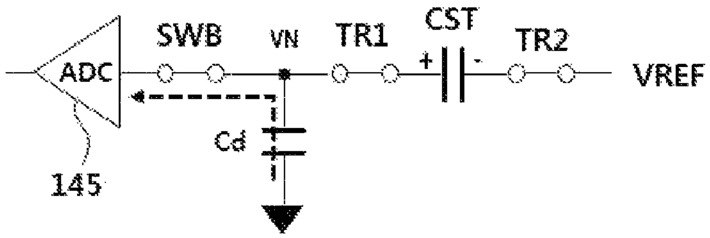
Figure 17:
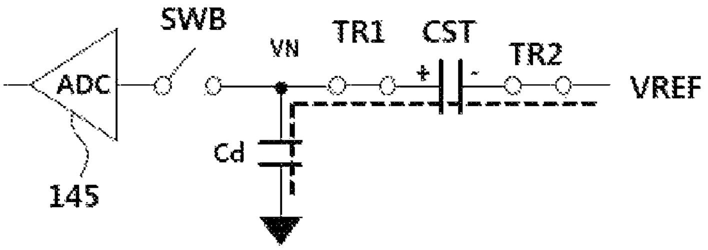
Figure 18:
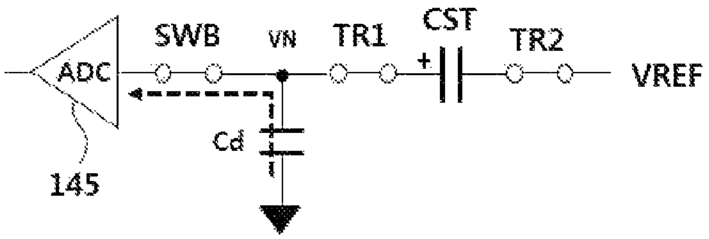

As shown in FIG. 16, a first parasitic capacitance of the first parasitic capacitor Cd formed at the data line may be detected through a first node VN between a second switch SWB and the first switching transistor TR1. For this detection, the second switch SWB may be turned on, and an AD converter ADC may perform a sensing operation.

The above-described lookup table extraction operation may be performed before a procedure before the fourth period P4 of FIG. 10, that is, the sensing operation. For example, under the condition that a lookup table is extracted through the above-described procedure, a first node voltage VN[V], which may be "Cst/(Cst+Cd)", may be acquired when the reference voltage VREF[V] is 1V. In addition, a lookup table capable of estimating the first parasitic capacitance formed at the data line based on the first node voltage VN[V], that is, "VN=Cst/(Cst+Cd)×VREF" may be provided.

Meanwhile, the first parasitic capacitance formed at the data line or a second parasitic capacitance formed at the reference line VREF may have volatility varying in accordance with driving conditions of the device, surrounding environmental conditions, etc. In order to minimize such volatility, accordingly, operations of FIGS. 15 and 16 may be repeated under the condition that the reference voltage applied to the reference line VREF is varied and, as such, a first parasitic capacitance of the first parasitic capacitor Cd may be provided as a lookup table.

After the lookup table is provided through the above-described previous operations, the first and second switching transistors TR1 and TR2 may be turned on, and a reference voltage may be applied and, as such, a lookup table for the reference voltage and the first node voltage may be extracted.

Thereafter, the second switch SWB may be turned on in a state in which the first and second switching transistors TR1 and TR2 are turned on, and a degradation information value may then be acquired from the capacitor CST included in the subpixel and the first parasitic capacitor Cd formed at the data line. In this case, the acquired degradation information value, that is, Vth, may be explained as being derived from the first node VN in order to remove the first parasitic capacitance formed at the data line. This may be expressed as "VN=Cst/(Cst+Cd)×Vth".

Figure 19:
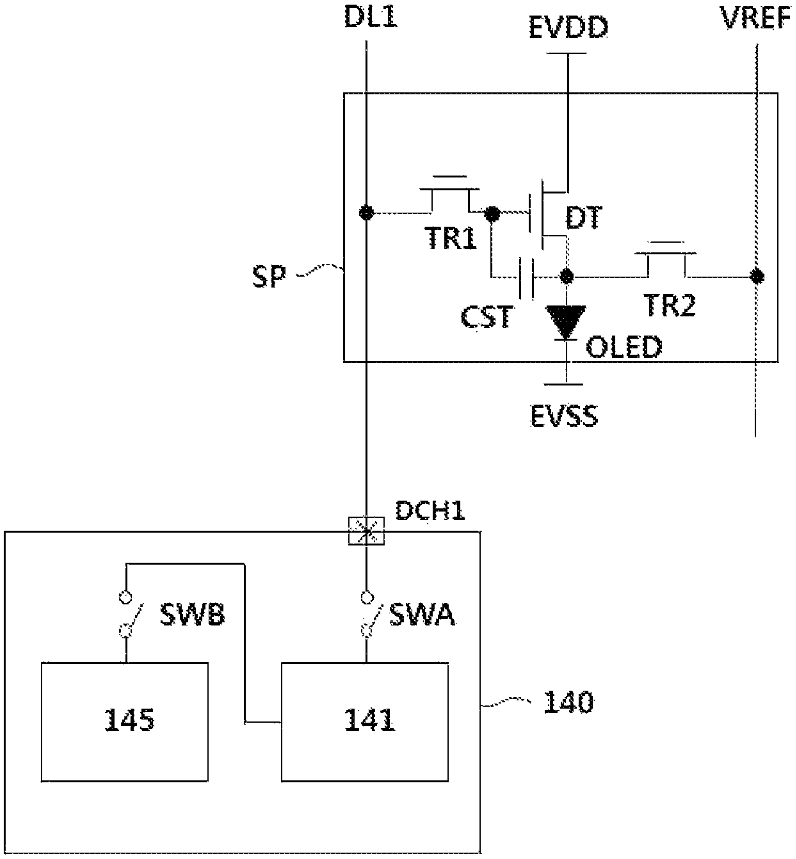
FIG. 19 is a circuit diagram briefly showing a subpixel and a data driver according to a second embodiment of the present invention.
Figure 20:
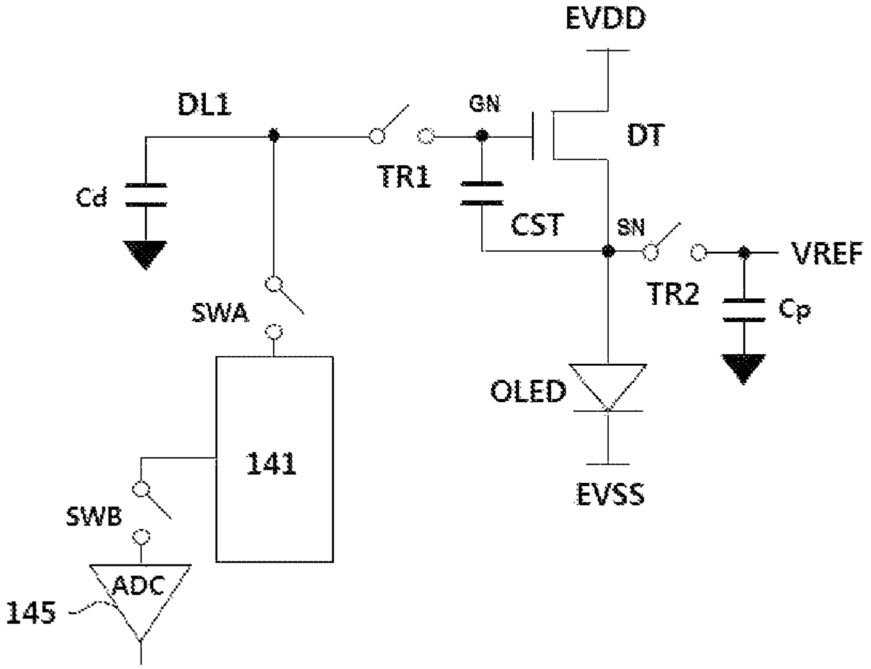
FIG. 20 is a circuit diagram more concretely showing a part of a configuration of the data driver shown in FIG. 19.
Figure 21:
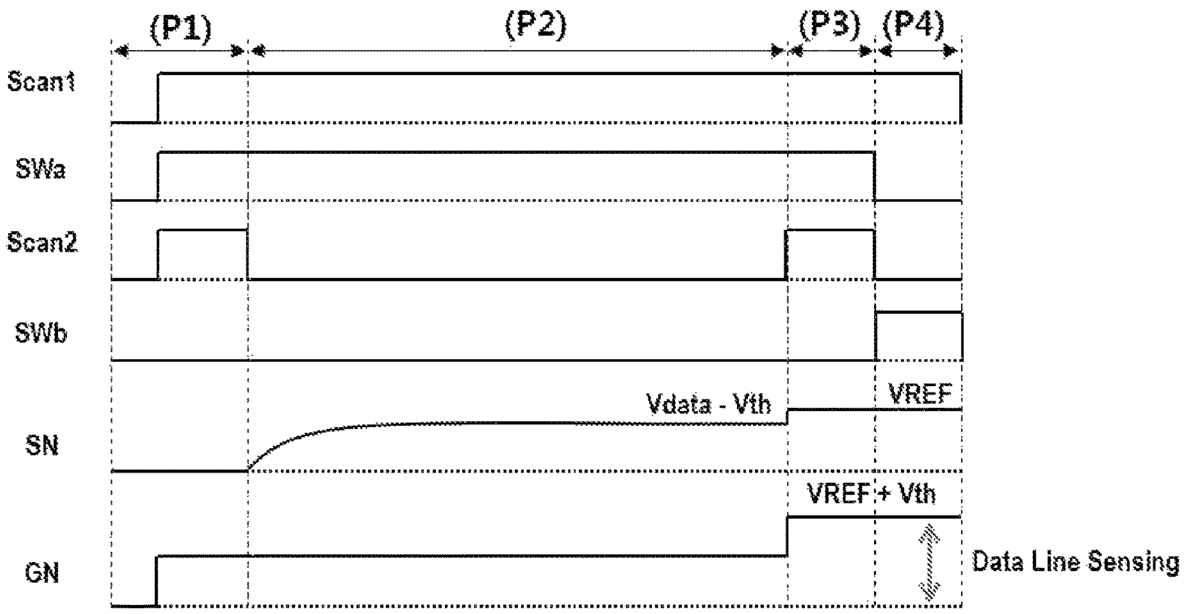
FIG. 21 is a driving waveform diagram explaining a driving method of the light emitting display device according to the second embodiment of the present invention.

FIG. 19 is a circuit diagram briefly showing a subpixel and a data driver according to a second embodiment of the present invention. FIG. 20 is a circuit diagram more concretely showing a part of a configuration of the data driver shown in FIG. 19. FIG. 21 is a driving waveform diagram explaining a driving method of the light emitting display device according to the second embodiment of the present invention. FIGS. 23 to 26 are circuit diagrams explaining a configuration of a DA converter according to the second embodiment of the present invention and an operation thereof.

As shown in FIG. 19, one subpixel SP may include a first switching transistor TR1, a driving transistor DT, a second switching transistor TR2, a capacitor CST, and an organic light emitting diode OLED.

A data driver 140 may include a first switch SWA, a second switch SWB, a first driving circuit 141, a second driving circuit 145, etc. The data driver 140 may not only output a sensing data voltage, a display data voltage, a black data voltage, etc. through a first input/output channel DCH1, but also may acquire a degradation information value formed at the subpixel SP.

The first switch SWA may be connected, at a first electrode thereof, to the first input/output channel DCH1 while being connected, at a second electrode thereof to the first driving circuit 141 and connected, at a control electrode thereof, to a control circuit internally included in the data driver 140. The first switch SWA may electrically connect or disconnect the first driving circuit 141 to or from the first input/output channel DCH1, in response to a first switch control signal output from the control circuit.

The second switch SWB may be connected, at a first electrode thereof, to the first driving circuit 141 while being connected, at a second electrode thereof to the second driving circuit 145 and connected, at a control electrode thereof, to the control circuit internally included in the data driver 140. The second switch SWB may electrically connect or disconnect the second driving circuit 145 to or from the first driving circuit 141, in response to a second switch control signal output from the control circuit. The second driving circuit 145 may include an AD converter ADC in order to convert a degradation information value having an analog form into sensing data having a digital form.

As shown in FIG. 20, the first driving circuit 141 may include a current-to-voltage converter (I/V converter) configured to convert current into a voltage and a DA converter DAC, in order to not only output a sensing data voltage, a display data voltage, a black data voltage, etc., but also to acquire a degradation information value.

Similarly to the first embodiment of the present invention, in the second embodiment of the present invention, a degradation information value may be incorrectly acquired due to influence of charge sharing when the capacitance of the capacitor CST included in the subpixel is greater than a capacitance of a first parasitic capacitor Cd formed at a data line.

Similarly to the first embodiment of the present invention, as shown in FIG. 21, the light emitting display device according to the second embodiment of the present invention may be driven in an order of a first period P1, a second period P2, a third period P3 and a fourth period P4.

In the second embodiment of the present invention, however, the sensing data voltage and the reference voltage may be varied to be equal or approximate to each other in level during the third period P3, in order to solve the problem in which a degradation information value is incorrectly acquired due to the first parasitic capacitor Cd formed at the data line. To this end, a first switch signal SWa may be applied in a logic high state in a period from the first period P1 to the third period P3. As a result, the voltage of a source node SN may rise while exhibiting a level variation equal or approximate to that of a gate node GN.

Figure 22:
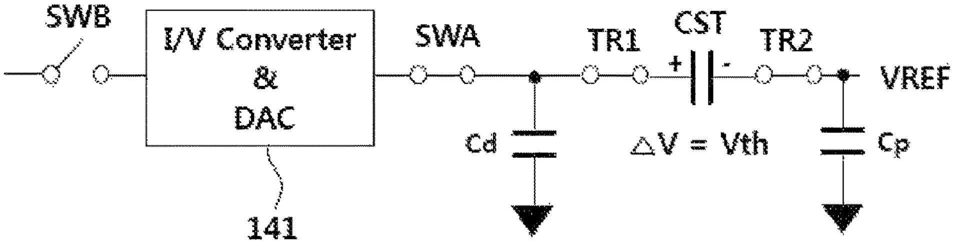

As shown in FIG. 22, the first and second switching transistors TR1 and TR2 and the first switch SWA may be in a turn-on state. For this reason, when the voltage of the source node SN rises to have a level equal or approximate to that of the gate node GN, current may flow toward a first node VN connected to the data line due to a voltage difference across the capacitor CST included in the subpixel. The I/V converter included in the first driving circuit 141 may detect, as a degradation information value ($\Delta V = Vth$), an amount of current flowing through the data line, in order to extract a threshold voltage of the driving transistor DT.

Figure 23:
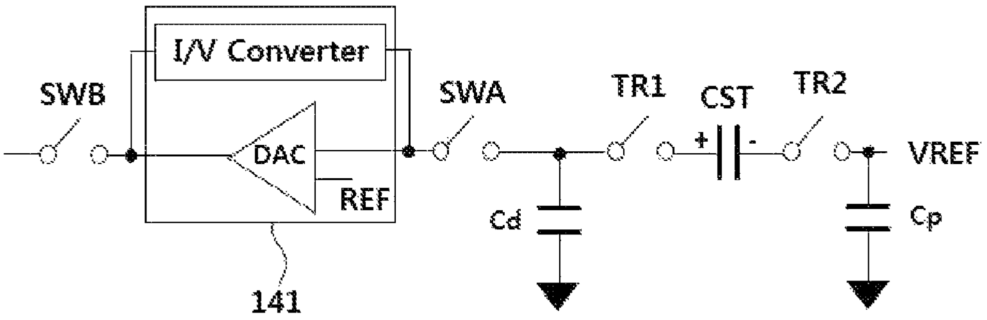
FIGS. 23 to 26 are circuit diagrams explaining a configuration of a DA converter according to the second embodiment of the present invention and an operation thereof.

As shown in FIG. 23, the first driving circuit 141 may include an I/V converter and a DA converter DAC. The I/V converter and the DA converter DAC, which are included in the first driving circuit 141, may operate in the form of a current integrator upon acquiring a degradation information value.

Figure 24:
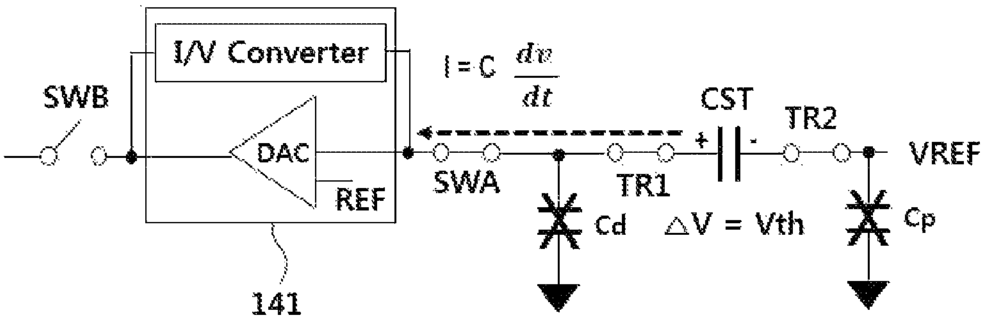

As shown in FIG. 24, the first driving circuit 141, the driving mode of which has been switched to the form of a current integrator, may instantaneously acquire the degradation information value ($\Delta V = Vth$) stored in the capacitor CST included in the subpixel and, as such, may exclude a problem associated with a first parasitic capacitance of the first parasitic capacitor Cd formed at the data line and a second parasitic capacitance of a second parasitic capacitor Cp formed at a reference line.

Figure 25:
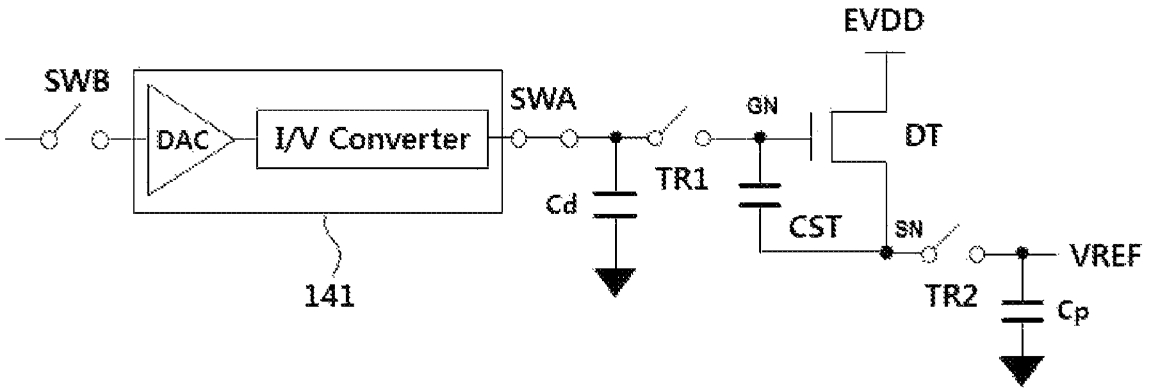

As shown in FIG. 25, the I/V converter and the DA converter DAC included in the first driving circuit 141 may operate in the form of a current mirror upon acquiring a degradation information value.

Figure 26:
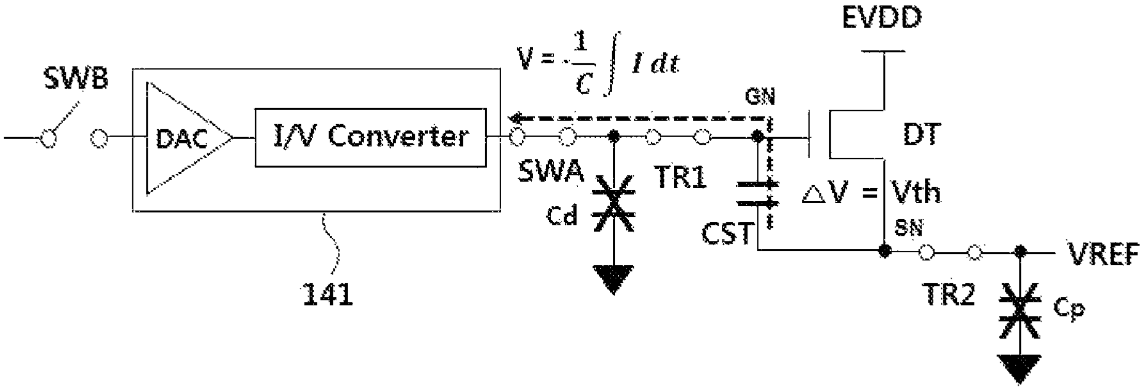

As shown in FIG. 26, the first driving circuit 141, which has been switched to the form of a current mirror, may instantaneously acquire the degradation information value ($\Delta V = Vth$) stored in the capacitor CST included in the subpixel and, as such, may exclude a problem associated with a first parasitic capacitance of the first parasitic capacitor Cd formed at the data line and the second parasitic capacitance of the second parasitic capacitor Cp formed at the reference line.

As apparent from the above description, in accordance with the exemplary embodiments of the present invention, it may be possible to acquire and compensate for a degradation information value of an element included in a subpixel and, as such, to remove a separate sensing line. In addition, in accordance with the exemplary embodiments of the present invention, it may be possible to omit a procedure of charging a parasitic capacitor and to simultaneously acquire degradation information values as to three subpixels and, as such, to reduce a sensing time.

It will be apparent to those skilled in the art that various modifications and variations can be made in the light emitting display device and the driving method thereof of the present disclosure without departing from the technical idea or scope of the disclosure. Thus, it is intended that the present disclosure cover the modifications and variations of this disclosure provided they come within the scope of the appended claims and their equivalent.

What is claimed is:

1. A light emitting display device, comprising:

a display panel comprising subpixels connected to a reference line; and a data driver connected to data lines of the display panel, wherein the data driver is configured to simultaneously acquire degradation information values as to the subpixels respectively through the data lines after driving transistors comprised respectively in the subpixels perform a source-following operation by a reference voltage transmitted through the reference line and a data voltage for sensing transmitted through the data lines, and wherein the data driver is further configured to:

determine parasitic capacitances formed respectively at the data lines based on a previously-extracted lookup table, and estimate degradation degrees of the driving transistors comprised respectively in the subpixels, with the parasitic capacitances removed, based on the degradation information values acquired respectively through the data lines and based on the respective parasitic capacitances determined based on the previously-extracted lookup table.

2. The light emitting display device according to claim 1, wherein the lookup table is provided based on operations of driving the subpixels such that charge sharing occurs between capacitors comprised in the subpixels and parasitic capacitors formed at the data lines, and repeatedly detecting parasitic capacitances of the parasitic capacitors formed at the data lines while varying the reference voltage.

3. The light emitting display device according to claim 1, wherein each of the subpixels further comprises:

a capacitor having a first electrode connected to a gate electrode of the driving transistor and a second electrode connected to a second electrode of a corresponding driving transistor among the driving transistors;

an organic light emitting diode having an anode connected to the second electrode of the corresponding driving transistor and a cathode connected to a second power line;

a first switching transistor having a gate electrode connected to a first scan line, a first electrode connected to a corresponding one of the data lines, and a second electrode connected to a gate electrode of the corresponding driving transistor; and a second switching transistor having a gate electrode connected to a second scan line, a first electrode connected to the reference line, and a second electrode connected to the anode of the organic light emitting diode.

4. A method of driving the light emitting display device of claim 1, comprising:

applying the reference voltage through the reference line connected to the subpixels of the display panel;

applying the data voltage for sensing through the data lines of the display panel by driving the data driver configured to drive the display panel;

simultaneously acquiring the degradation information values as to the subpixels respectively through the data lines after the driving transistors comprised respectively in the subpixels perform the source-following operation by the reference voltage transmitted through the reference line and the data voltage for sensing transmitted through the data lines;

determining parasitic capacitances formed respectively at the data lines based on a previously-extracted lookup table; and estimating degradation degrees of the driving transistors comprised respectively in the subpixels, with the parasitic capacitances removed, based on the degradation information values acquired respectively through the data lines and on the respective parasitic capacitances determined based on the previously-extracted lookup table.

5. A light emitting display device, comprising:

a display panel comprising subpixels connected to a reference line; and a data driver connected to data lines of the display panel, wherein the data driver is configured to:

vary a reference voltage transmitted through the reference line and a data voltage for sensing transmitted through the data lines during the same period such that the reference voltage and the data voltage for sensing are equal to each other, after driving transistors comprised in the subpixels perform a source-following operation by the reference voltage and the data voltage for sensing, and then simultaneously acquire amounts of current flowing respectively through the data lines as degradation information values of the subpixels.

6. The light emitting display device according to claim 5, wherein the data driver includes:

a current-to-voltage converter connected to a corresponding data line among the data lines and configured to convert current on the corresponding data line into a voltage; and a digital-to-analog converter connected to the current-to-voltage converter and configured to convert a digital signal into an analog signal.

7. The light emitting display device according to claim 6, wherein the current-to-voltage converter and the digital-to-analog converter are configured to operate as an integrator and to detect an amount of current flowing through the corresponding data line as the degradation information value of a corresponding one of the subpixels, with the reference voltage and the data voltage for sensing varied to be equal to each other.

8. The light emitting display device according to claim 6, wherein the current-to-voltage converter and the digital-to-analog converter are configured to operate as a current mirror and to detect an amount of current flowing through the corresponding data line as the degradation information value of a corresponding one of the subpixels, with the reference voltage and the data voltage for sensing varied to be equal to each other.

9. A method of driving the light emitting display device of claim 6, comprising:

applying the reference voltage through the reference line connected to the subpixels of the display panel;

applying the data voltage for sensing through the data lines of the display panel by driving the data driver configured to drive the display panel; and varying the reference voltage transmitted through the reference line and the data voltage for sensing transmitted through the data lines such that the reference voltage and the data voltage for sensing are equal to each other, after the driving transistors comprised in the subpixels perform the source-following operation by the reference voltage and the data voltage for sensing, and then simultaneously acquiring amounts of current flowing respectively through the data lines as the degradation information values of the subpixels.

10. The light emitting display device according to claim 6, wherein the current-to-voltage converter and the digital-to-analog converter are configured to operate as an integrator or a current mirror and are configured to detect an amount of current flowing through the corresponding data line as the degradation information value of a corresponding one of the subpixels, with the reference voltage and the data voltage for sensing varied to be equal to each other.

11. The light emitting display device of claim 1, wherein the previously-extracted lookup table is configured to provide the parasitic capacitances formed respectively at the data lines based on the reference voltage.

12. The light emitting display device of claim 1, wherein:

each of the subpixels further comprises a capacitor having a first electrode connected to a gate electrode of a corresponding driving transistor among the driving transistors and a second electrode connected to a second electrode of the corresponding driving transistor; and the data driving circuit is further configured to acquire the degradation information values through a node connected between the first electrode of the capacitor and the gate electrode of the corresponding driving transistor.

* * * * *